(12) United States Patent
Cleary

(10) Patent No.: US 9,516,172 B2
(45) Date of Patent: Dec. 6, 2016

(54) ENRICHING AND ANALYZING CDR DATA TO IDENTIFY VOICE TRAFFIC ROUTING THROUGH AN INTERMEDIATE PROVIDER

(71) Applicant: VERIZON PATENT AND LICENSING INC., Arlington, VA (US)

(72) Inventor: Charles Brian Cleary, Alpharetta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 14/296,946

(22) Filed: Jun. 5, 2014

(65) Prior Publication Data

US 2015/0358475 A1 Dec. 10, 2015

(51) Int. Cl.
*H04M 15/00* (2006.01)
*H04M 15/06* (2006.01)

(52) U.S. Cl.
CPC ............ *H04M 15/50* (2013.01); *H04M 15/06* (2013.01); *H04M 15/41* (2013.01); *H04M 15/8044* (2013.01); *H04M 15/39* (2013.01)

(58) Field of Classification Search
CPC ...... H04M 15/00; H04M 15/41; H04M 15/51; H04M 15/53; H04M 15/55; H04Q 3/0045; H04W 40/00; H04W 76/02
USPC ..... 379/111, 112.01, 114.01, 114.28, 115.01, 379/115.03, 118, 121.01, 126, 219, 379/221.02, 221.08, 221.12, 221.14, 224, 379/229, 230, 112.07, 112.08; 455/406, 455/422.1, 426.2, 432.2, 438, 445, 552.1, 455/554.2
See application file for complete search history.

(56) References Cited

U.S. PATENT DOCUMENTS

| | | | |
|---|---|---|---|
| 6,298,123 B1 | 10/2001 | Nolting et al. | |
| 6,351,453 B1 | 2/2002 | Nolting et al. | |
| 6,385,301 B1 | 5/2002 | Nolting et al. | |
| 6,411,681 B1 | 6/2002 | Nolting et al. | |
| 6,744,866 B1 | 6/2004 | Nolting et al. | |
| 7,088,806 B2 * | 8/2006 | Liu ..................... | H04M 3/2218 379/121.05 |
| 7,224,686 B1 * | 5/2007 | Doskow ............... | H04Q 3/0025 370/352 |
| 7,260,192 B2 | 8/2007 | Nolting et al. | |
| 7,526,322 B2 | 4/2009 | Whistler | |

(Continued)

*Primary Examiner* — Binh Tieu

(57) ABSTRACT

A method describes enriching a Call Detail Record (CDR) to identify traffic routing through network providers. The method comprises the steps of obtaining Operator Carrier Numbers (OCNs) assigned to network providers operating in a network; obtaining trunk group identifiers for identifying trunks configured to interconnect an Originating Provider's network including a Mobile Switching Center (MSC) with network providers; and identifying network providers configured to communicate through the trunk groups with the Originating Provider's network, including the MSC. The method also obtains a Called Party Number (CdPN) from the CDR; and associates the CdPN with an OCN of a network provider. The method also determines whether the OCN associated with the trunk group and the OCN of the CdPN are the same. If they are the same, then the method concludes that the Originating Provider, including the MSC is communicating directly with the network provider without any other network provider operating as an Intermediate Provider; if they are not the same, then the method concludes that the Originating Provider including the MSC is communicating indirectly with the network provide involving another network provider operating as an Intermediate Provider.

20 Claims, 8 Drawing Sheets

(56) References Cited

U.S. PATENT DOCUMENTS

| | | | | |
|---|---|---|---|---|
| 7,609,826 B2* | 10/2009 | Liu | ................ | H04M 15/00 |
| | | | | 379/114.14 |
| 7,961,863 B2* | 6/2011 | Long | ................ | H04Q 3/0062 |
| | | | | 379/219 |
| 2004/0252818 A1* | 12/2004 | Liu | ................ | H04M 3/2218 |
| | | | | 379/126 |
| 2005/0037750 A1* | 2/2005 | Goering | ................ | H04W 76/02 |
| | | | | 455/432.1 |
| 2005/0250501 A1* | 11/2005 | Mobin | ................ | H04Q 3/0045 |
| | | | | 455/445 |
| 2006/0203984 A1* | 9/2006 | Christie | ................ | H04J 3/125 |
| | | | | 379/188 |
| 2007/0172037 A1* | 7/2007 | Kreckel | ................ | H04M 15/00 |
| | | | | 379/111 |
| 2008/0064409 A1* | 3/2008 | Goering | ................ | H04W 76/02 |
| | | | | 455/445 |
| 2008/0075087 A1* | 3/2008 | Christie | ................ | H04J 3/125 |
| | | | | 370/395.3 |
| 2008/0280616 A1* | 11/2008 | Xu | ................ | H04L 45/04 |
| | | | | 455/445 |
| 2011/0104462 A2* | 5/2011 | Berteau | ................ | B32B 27/00 |
| | | | | 428/212 |
| 2016/0127808 A1* | 5/2016 | Wong | ................ | H04M 3/36 |
| | | | | 379/112.04 |

* cited by examiner

| | COMMON CDR DATA FIELDS | | | | | | | | ADDED CDR DATA FIELDS (ENRICHMENT) | | |
|---|---|---|---|---|---|---|---|---|---|---|---|
| SEQUENCE NUMBER | CPN | CdPN | CALL START (DATE TIME) | CALL DURATION (MINUTES) | CN | DISPOSITION | TRUNK GROUP NUMBER | FAULT CODE | OCN OF CdPN | OCN OF TRUNK GROUP | ROUTING (A OR B) |
| 10011 | 770-797-XXXX | 501-529-XXXX | 042214.22:00:03 | 00:02:00 | 770-797-XXXX | ANSWERED | 301 | 00 NO ERROR | 9417 | G056 | B |
| 10012 | 501-529-XXXX | 770-797-XXXX | 042214.22:00:05 | 00:05:00 | 501-529-XXXX | ANSWERED | 502 | 00 NO ERROR | 9417 | G056 | B |
| 10013 | 206-399-XXXX | 501-529-XXXX | 042214.22:00:10 | 00:00:00 | 206-399-XXXX | UNANSWERED | 704 | 17 BUSY NO ANSWER | 9417 | G056 | B |
| 10014 | 501-517-XXXX | 501-529-XXXX | 042214.22:00:15 | 00:11:00 | 501-517-XXXX | ANSWERED | 601 | 00 NO ERROR | 9417 | 9417 | A |
| 10015 | 412-672-XXXX | 501-529-XXXX | 042214.22:00:32 | 00:03:00 | 412-672-XXXX | ANSWERED | 301 | 00 NO ERROR | G056 | 6563 | B |
| 10016 | 412-664-XXXX | 770-797-XXXX | 042214.22:00:38 | 01:04:00 | 412-664-XXXX | ANSWERED | 400 | 00 NO ERROR | G056 | 6563 | B |

FIG. 4

ENRICHING AND ANALYZING CDR DATA TO IDENTIFY VOICE TRAFFIC ROUTING THROUGH AN INTERMEDIATE PROVIDER

BACKGROUND

Within the telecommunications industry, interconnection is the physical linking of a carrier's network with equipment or facilities not belonging to that network for the exchange of telecommunications traffic such as a voice call. The term may refer to a connection between a carrier's facilities and the equipment belonging to its customer, or to a connection between carriers. The interconnection between carriers may be direct or indirect, where direct interconnection is a connection between end carriers not involving any intermediate carrier; and indirect interconnection involves an intermediate carrier to transit traffic between the end carriers. For voice calls that are indirectly exchanged between end carriers, the carrier (provider) originating the call is called the Originating Provider, the provider transiting the call is called the Intermediate Provider, and the provider terminating the call is called the Terminating Provider. A call may be routed directly from an Originating Provider (e.g., Verizon Wireless®) to a Terminating Provider. Alternatively, the call may be routed indirectly from the Originating Provider to the Terminating Provider, by routing the call through an Intermediate Provider's network. Identifying traffic (calls) routing through Intermediate Providers has significant value to the Originating Provider (e.g., Verizon Wireless®).

Intermediate Providers, also known as Transit Providers, charge Minute-of-Use (MOU) rates for the traffic (calls) routing through their networks. Having a capability to identify traffic routing through Intermediate Providers may enable the Originating Provider (e.g., Verizon Wireless®) to mitigate some of these charges by implementing options to directly route traffic to Terminating Providers. Hence, a need exists to accurately identify traffic routing through an Intermediate Provider, where the Intermediate Provider may be an LEC Tandem, an Alternate Tandem Provider (ALT), or another third-party provider.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 illustrates an example of a Call Detail Record (CDR) including added enriched fields;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or connections have been described at a relatively high level, without detail, in order to avoid unnecessarily obscuring aspects of the present teachings.

As will be explained, the traffic tracking system of the present application may perform several types of enrichment of Call Detail Records (CDRs). The relevant CDRs are generated by the Originating Provider's telecommunications switch, collected by the Originating Provider's Data Mediation system, and stored in the traffic tracking system.

Figure 1:
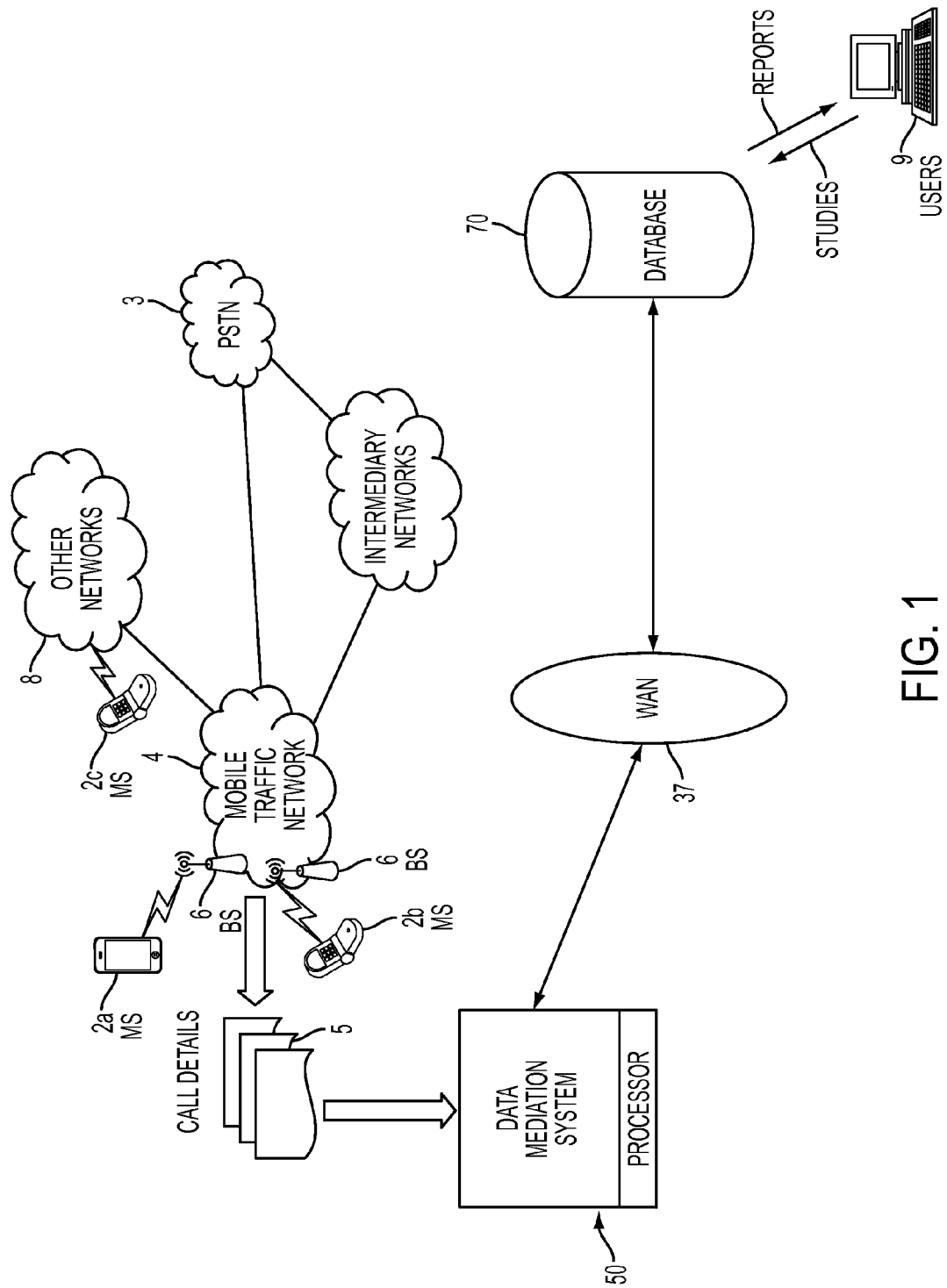
FIG. 1 is a block diagram showing high-level functional aspects of a traffic tracking system.

FIG. 1 provides a high-level illustration of the functions involved. Typically, customers using subscriber devices, such as the mobile telephone 2b, make calls through the public switching telephone network (PSTN) 3. The Mobile Traffic network 4 that originates the call uses certain billing equipment and/or monitoring equipment to accumulate records 5 of the details of the calls. The Call Detail Records (CDRs) 5 for each call include a wide variety of different items of information about the call including, for example, calling and called party numbers, the time of the call, the duration of the call if completed, the type of release if terminated without completion, identification of office(s) serving the call, etc.

In the example shown in FIG. 1, Mobile Traffic Network 4 communicates with PSTN 3. For the sake of simplicity, only two mobile stations (MSs) 2a and 2b are shown communicating through Mobile Traffic Network 4, by way of two base stations (BSs) 6. Other networks 8, using a mobile station MS 2c, are also shown communicating with Mobile Traffic Network 4 and PSTN 3. As an example, Mobile Traffic Network 4 may be an Originating Provider (e.g., Verizon Wireless®) and Other Networks 8 may be Intermediate Providers and/or Terminating Providers. It will be understood that Mobile Traffic network 4 and Other Networks 8 may accumulate Call Detail Records 5 without transmitting through PSTN 3.

The mobile traffic network 4 allows users of mobile stations 2a and 2b (and other mobile stations not shown), to initiate and receive telephone calls to each other, as well as through PSTN 3 when using telephones connected to the PSTN. The networks 4 and 8 typically also offer a variety of data services, via a global network (e.g., the Internet), such as downloads, web browsing, email, etc.

The networks 4 and 8 may be implemented by a number of interconnected networks. Hence, the overall networks 4 and 8 may include a number of Radio Access Networks (RANs), as well as regional ground networks interconnecting a number of RANs and a Wide Area Network (WAN) interconnecting the regional ground networks to core network elements. A regional portion of network 4, such as that serving mobile stations 2a and 2b, may include one or more RANs and a regional circuit and/or packet switched network and associated signaling network facilities.

Physical elements of a RAN operated by one of the mobile service providers or carriers, include a number of base stations represented in the example by the base stations (BSs) 6. Although not separately shown, such base station 6 may include a Base Transceiver System (BTS), which may communicate via an antennae system at the site of the base station and over the airlink with one or more of mobile stations 2a and 2b, when the mobile stations are within range. Each base station may include a BTS coupled to several antennae mounted on a radio tower within a coverage area, often referred to as a "cell."

The Other Networks 8 may also include a traffic network which carries communications and data for mobile stations between base stations and other elements with, or through which, the mobile stations communicate. It will be understood that the various network elements may communicate with each other and other networks (e.g., PSTN 3 and the Internet) either directly, or indirectly.

Although not shown, a provider or carrier may also operate a number of systems that provide ancillary functions in support of the communications services provided through mobile data networks 4 and 8, and those elements may communicate with other nodes or elements in the system, via one or more private IP type packet data networks (sometimes referred to as an Intranet), i.e., a private network. Examples of such systems may include one or more application servers and related servers.

The Call Detail Records 5 supplied from Mobile Traffic Network 4 (the "Originating Provider" in FIG. 1) are sent to the Originating Provider's data mediation system 50. The data mediation system 50 may potentially collect CDRs from the PSTN 3 or Other Networks 8. However, networks do not always generate the same types of CDRs (do not always generate CDRs of the same format), do not secure data connections between Providers and may not exist to support sharing of CDRs. Providers are typically required to pay fees to obtain CDRs from another Provider's network. As a result, the carrier originating the traffic i.e. the Originating Provider, typically relies on the CDRs generated from its own network (its telecommunication equipment). Information contained in the collected CDRs is loaded into appropriate tables in one or more databases. The data mediation system 50 stores the bulk detail data in an accessible form. Further processing, however, is needed to allow analysis and output of the results in desired aggregate forms. Data from the mediation system 50 is prepared and uploaded through WAN 37 (for example) for input to a database 70.

The data mediation system 50 summarizes details of calls and categorizes calls into logical groupings. This may involve modifying the call details by application of reference data to the call details. The reference data may include Local Exchange & Routing Guide (LERG) data, such as the Operating Carrier Number (OCN), local call jurisdiction data, and/or other information used to enrich the overall CDR data. The processed call detail data is then uploaded to a decision support database 70. It will be appreciated that the data mediation system and the database may be located in one system or separate systems, and may be coupled directly without any WAN in between.

The database 70 includes the prepared call details which may be compiled into data reports for output to a user's terminal 9 (for example). The database 70 may capture and store high level summary data which may be displayed through user terminal 9 in a variety of ways. The data may include CDRs enriched with various information, as will be detailed below.

The traffic tracking system of the present application, therefore, provides effective collection and analysis of CDRs enriched with various information. The CDRs required for analysis may be collected from a single Provider's network without reliance on the use of CDRs from another Provider's network. Yet, the CDRs enriched with information enable analysis of how traffic was exchanged (directly or indirectly) between the Originating Provider and the Terminating Provider. It may be helpful at this point to review the structure and operation of a telephone network, at a relatively high level.

Figure 2:
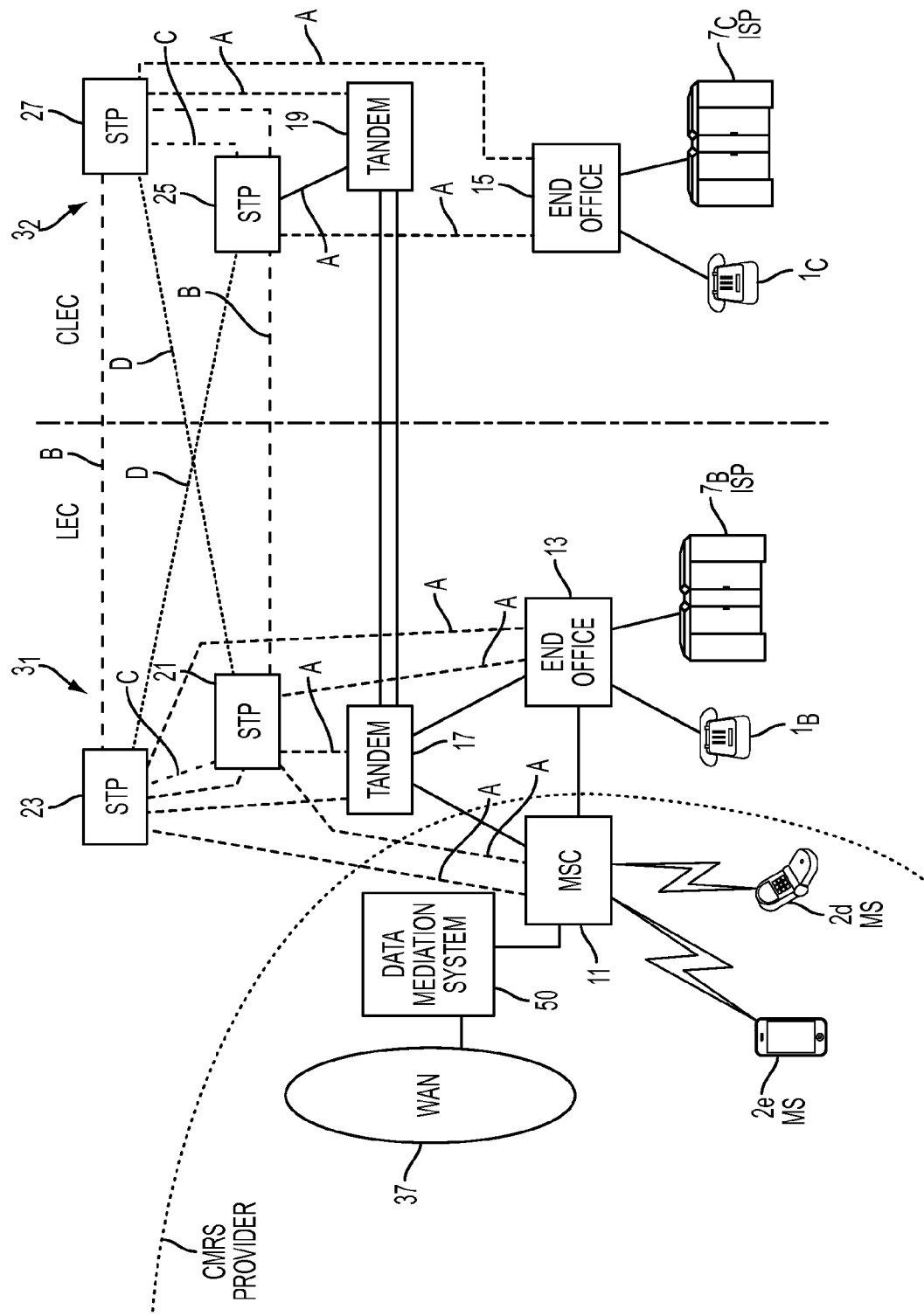
FIG. 2 provides a block diagram overview of a public switching telephone network with a traffic tracking system, illustrating an actual switched telephone network and elements of the traffic tracking system used to capture call data from that network.

Referring to FIG. 2, there is shown a block diagram of a switching telephone network (for example, an SS7 (signaling system seven) network) that carries call control signaling for the network. The telephone network may include many segments operated by different carriers, including LECs and interexchange carriers (IXCs). For purposes of this discussion, FIG. 2 illustrates three such segments, or sub-networks. One sub-network is a network $3_1$, operated by an LEC. The second sub-network may be that of an IXC or any other carrier, but for purposes of this discussion, FIG. 2 depicts the second network or segment $3_2$ operated by a Competitive Local Exchange Carrier (CLEC). The third sub-network is represented as a CMRS provider (mobile service provider). Each sub-network shown in FIG. 2 may have its own data mediation system 50. However, for simplicity, only the data mediation system of the CMRS provider is shown in FIG. 2. The LEC shown in FIG. 2 may be an Originating Provider, Intermediate Provider, and/or a Terminating Provider; the CLEC shown in FIG. 2 may also be an Originating Provider, Intermediate Provider, and/or a Terminating Provider. Since CMRS providers typically do not operate PSTN Tandems and seldom transit traffic through their mobile networks, the CMRS provider shown in FIG. 2 represents only an Originating Provider, or Terminating Provider.

The switched portion of the telephone network may include a series of telecommunication switches, which are conventionally referred to as signaling points (SPs) in reference to an SS7 network (for example). Certain of these SPs comprise end offices (EOs), Mobile Switch Centers (MSCs), or Tandems, illustrated at 11, 13, 15, 17 and 19 in FIG. 2.

The end office 13 represents one of the end offices operated by the LEC, whereas end office 15 represents one of the end offices operated by the CLEC. Moreover, end office 11 represents one of the CMRS provider's MSCs. As an example, end office 11 may be serving as an Originating Provider and end office 13 may be serving as a Terminating Provider. The end office 15 may also be serving as a Terminating Provider. Tandem 17 may be serving as an Intermediate Provider by transiting traffic between the CMRS provider's MSC 11 (Originating Provider) and the CLEC's end office 15 (Terminating Provider).

Each operating company (provider) may have its own network ID, which is used as the first three digits of the point codes of the SPs of that carrier's network. Also, each end office may reside within an area that is assigned NPA digits as an area code. Each exchange is identified by one or more three-digit codes, referred to as NXX digits. Each such code corresponds to the NXX digits of an NXX-XXXX (seven-digit) telephone number, or the three digits following the three area code digits (NPA) in a ten-digit telephone number. As a result, the NPA-NXX digits of telephone numbers also may serve as identifiers of end offices. Origination and destination telephone numbers appear in various SS7 signaling messages and various records, such as CDRs that the offices (MSCs, end offices and tandems) create for billing and the like.

Digital trunk circuits, shown as solid lines, interconnect the switching offices of each network in FIG. 2. Typically, local offices, such as MSC 11 and end office 13, are directly interconnected by trunk circuits. For overflow traffic and/or for connections to other carrier's (provider's) networks, the end offices 11 and 13 also connect via trunk circuits to a tandem office 17. In the CLEC network $3_2$, end office 15 connects through a trunk circuit to a tandem 19. The LEC and CLEC networks $3_1$, $3_2$ interconnect through trunk circuits shown, for example, between tandems 17 and 19, although end office interconnections are also possible. As an example, tandems 17 and 19 may be Intermediate Providers.

The signaling network comprises a series of Signal Transfer Points (STPs), shown at 21, 23, 25 and 27 and interconnecting data links indicated by dotted lines. Each STP in a network connects to the SP capable offices in that network via A links. Thus, in the LEC network $3_1$, the MSC 11, end office 13, and tandem 17 connect to STPs 21, 23 through A links. Similarly, end office 15 and tandem 19 in the CLEC network $3_2$ connect to STPs 25, 27 via A links.

Within the LEC network $3_1$, STPs 21 and 23 constitute a mated pair of STPs connected to each other via C links. Within the CLEC network $3_2$, STPs 25 and 27 also constitute a mated pair connected by C links. Each of these mated pairs serves its respective transport area and/or carrier network. The STP 21 connects to STP 25 via a B link, and STP 21 connects to STP 27 via a D link. Similarly, STP 23 connects to STP 27 through a B link, and the STP 23 connects to STP 25 through another D link.

The A, B, C and D links are physically identical links. The letter designations for these various links relate to cost in terms of ease of access. The A links represent the lowest cost. The B and D links have the same route cost with respect to SS7, so that the D designation is used only because it extends diagonally in the drawing. The C links are used to communicate between the two mated STPs of a pair. The STP pair cannot function without the C links. Unnecessary utilization of the C links causes congestion and prevents the paired STPs from performing their intended function. It will be appreciated that these links are referred to herein as "trunks".

The operation of placing a call, for example, from cell $2d$ to telephone 1B may be summarized with reference again to FIG. 2. The user picks up his cell $2d$ and dials the number of telephone 1B, which normally resides in end office 13. The MSC 11 generates an Initial Address Message (IAM) with a destination point code for end office 13 and an originating point code of MSC 11. The IAM includes a variety of information needed for call set-up. The MSC 11 sends the IAM to either STP 21 or STP 23. That STP examines the address information and its translation and routes the message over the next appropriate link, in this case over the A link to end office 13.

In response to the IAM message, end office 13 determines whether or not the line corresponding to that number is busy. If the line is available (not busy), end office 13 generates an Address Complete Message (ACM) to indicate that it received the request for a call and that the called line is available. The end office 13 sends the ACM message back by simply reversing the origination and destination point codes and sending the message over an A link to one of the STPs 21, 23. The ACM may or may not go over the A link that carried the IAM to end office 13, but it may go to the other STP of the pair. Again, the STP receiving the message examines the address and uses its translation to forward the message over another link to the appropriate destination, in this case MSC 11.

The MSC 11 sends a ring back tone over the line to the calling cell $2d$. At about this time, MSC 11 applies a ringing signal to the line to the called station 1B. The calling party hears the ring back tone and awaits an answer. The station 1B rings to alert persons at the destination to the presence of an incoming call.

If someone or an answering machine answers the call at station 1B, there is an off-hook condition on the line; and the end office 13 recognizes this as a ring-trip condition. The end office 13 interrupts the ringing signal on that line. The end office 13 also sends an Answer Message (ANS) back through the SS7 network to MSC 11, indicating that the called telephone station 1B was picked up.

At that point, the necessary trunk circuits between the offices are connected together and assigned to the call. The trunk connection may run through tandem 17, but in this example, the trunk connection extends directly between the end offices. The MSC 11 connects the line for cell $2d$ to the trunk circuit, and the end office 13 connects the line for station 1B to the trunk circuit. At this point, a complete voice-grade telephone connection exists between the two stations, and the parties may speak and receive verbal information.

The MSC 11, which as an example may be an Originating Provider, such as Verizon Wireless®, may utilize its connection to a data mediation system 50 for collecting CDRs containing call data for traffic analysis. A WAN may be used to transport the CDRs from the mediation system 50 to a computer system or a server running a database 70 where the accumulated CDR data may be enriched with various information and analyzed. The information (data) used for CDR enrichment and the process of enriching the CDRs are described below.

An aspect of the present application identifies when calls that start from an Originating Provider's network are routed through (or transited through) an Intermediate Provider's network in order to reach a Terminating Provider's Network. An aspect of the present application also identifies when calls that start from an Originating Provider's network directly reach a Terminating Provider's network, without having to transit through an Intermediate Provider's network. The Intermediate Provider may include any third party provider, such as an LEC Tandem, or an Alternate Tandem Provider (ALT).

Figure 3A:
FIG. 3A illustrates in graphic form an Originating Provider (an MSC) communicating directly with a Terminating Provider.
Figure 3B:
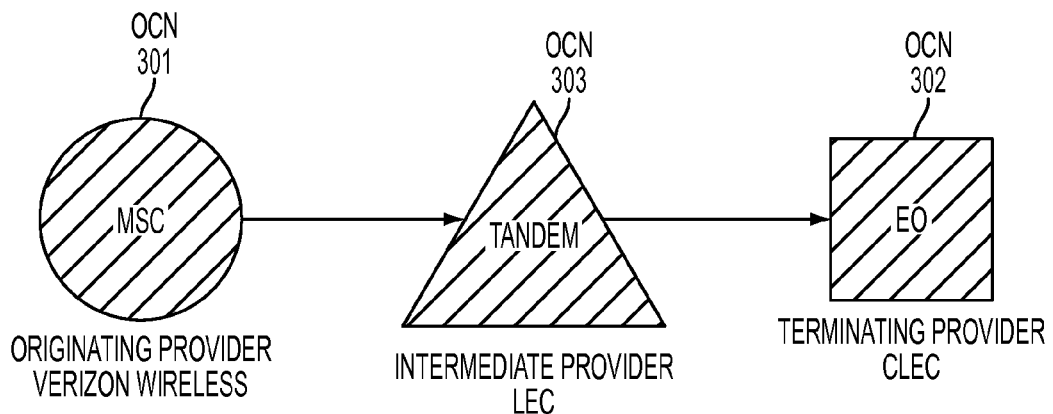
FIG. 3B illustrates in graphic form an Originating Provider (an MSC) communicating indirectly with a Terminating Provider by way of an Intermediate Provider.

Telecommunications carriers (providers) within the U.S. are assigned an Operating Carrier Number (OCN). Book 1 of the Telcordia Local Exchange Routing Guide (LERG) lists the OCN assignments of U.S. providers. As best shown in FIGS. 3A and 3B, the Mobile Switching Center (MSC) is operated by OCN 301 and is serving as an Originating Provider (for example, Verizon Wireless®). The EO is operated by OCN 302 and is serving as a Terminating Provider (for example, a CLEC). In FIG. 3B, the Tandem is operated by OCN 303 as an Intermediate Provider (for example, an LEC) for transiting traffic between the networks operated by OCN 301 and OCN 302. FIG. 3A does not show use of an Intermediate Provider.

Figure 5:
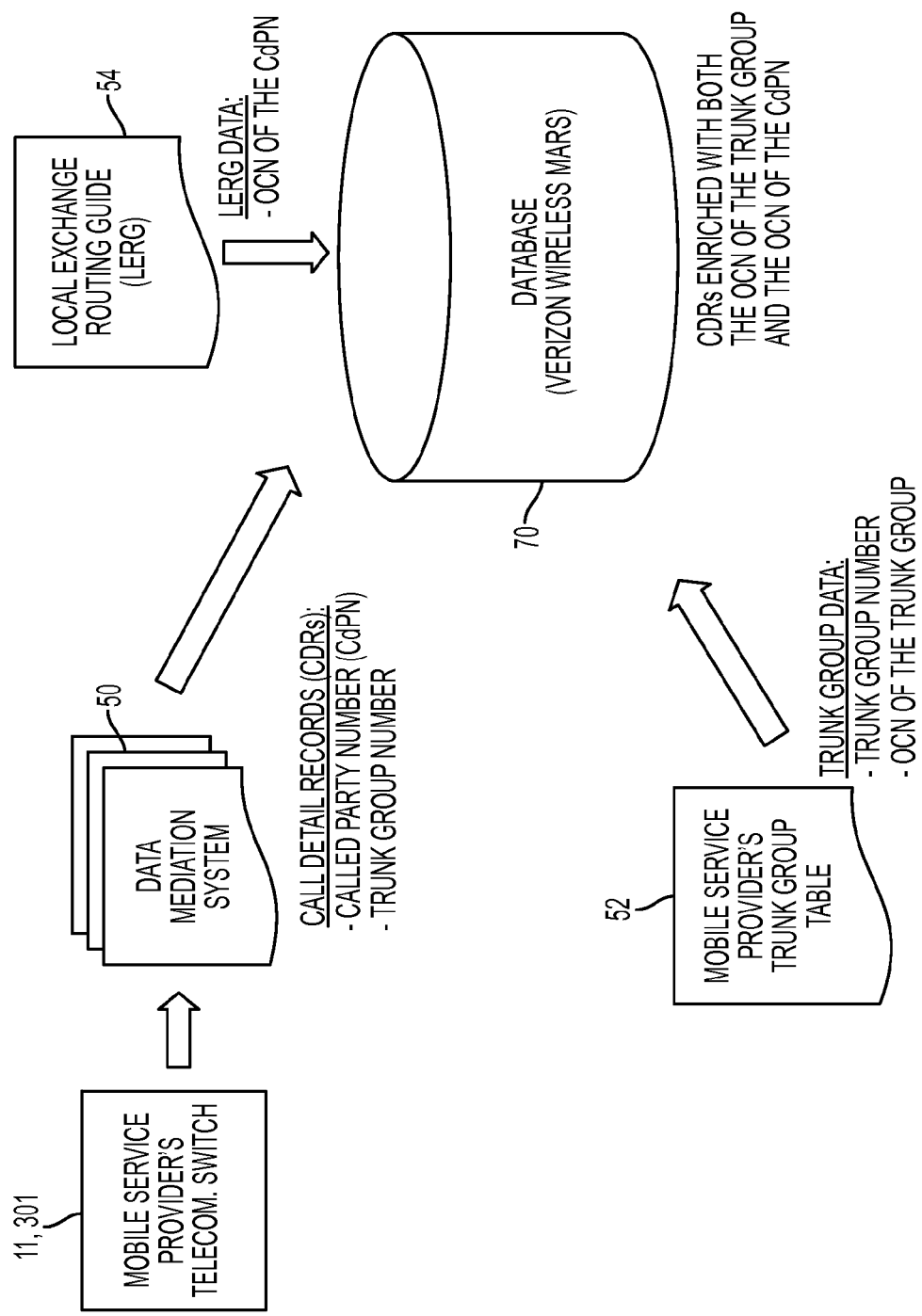
FIG. 5 provides a block diagram of an MSC's data mediation system collecting call records and enriching those call records with additional data, in accordance with an embodiment of the present invention.

Referring next to FIG. 5, there is shown a system for enriching and analyzing CDR data to identify voice traffic routing through an Intermediate Provider. An Originating Provider's MSC, designated as MSC 11 (FIG. 2) and OCN 301 (FIG. 3) is shown communicating with data mediation system 50, the latter processing call details 5 (FIG. 1) and generating a CDR for each call transacted by MSC 11. The CDR includes the Called Party Number (CdPN) and the interconnection identification (Trunk Group Number). The CdPN may be, for example, a 10 digit telephone number conventionally used in the U.S. (770-203-XXXX). The Trunk Group Number may be, for example, a 4 digit number (3635). The CdPN and the Trunk Group Number are tabulated in a CDR Table depicted in FIG. 4. These two data fields are considered common data fields in a CDR table. A more detailed description of the CDR is provided below.

A Call Detail Record, also known as a call data record, is a data record produced by a telecommunication switch (MSC, End Office, or Tandem), or other telecommunication equipment that contains information specific to a single instance of a phone call or other transaction. It is the automated equivalent of the paper tape written and timed by operators for long-distance calls in a manual telephone exchange.

Generally, CDRs are created at the end of a call but on some phone systems the data is available during the call. By way of simplistic example, a CDR describing a particular phone call may include the phone numbers of both the calling and receiving parties, the start time, and duration of the call. The CDRs also contain information which may be used for determining the amount of traffic routed via particular Trunk Group interconnections to or through other telecommunication switches, or networks.

Today, CDRs are collected electronically (over a WAN via RCP, or FTP). Once collected, the CDRs are checked (validation), reformatted (normalization) and consolidated for further processing. The combined process of collection, validation, normalization and consolidation is also referred to as Data Mediation.

The format in which CDRs are provided varies and is often configurable. Traditionally, the generating and handling of CDRs is known as Automatic Message Accounting, or AMA, which came into existence back in the 1940s. Today, telecommunications switches in North America still generate CDRs in the AMA format. The number (quantity) of data fields and information contained in the data fields of AMA formatted CDRs may vary based on the type of call (Local, Long Distance, Operator Services, International, Emergency, etc.) processed by a telecommunication switch. CDRs generated by telecommunication switches commonly include data fields containing the following information:

a) a unique sequence number identifying the CDR (Sequence Number)
b) the phone number of the subscriber originating the call (Calling Party or CPN)
c) the phone number receiving the call (Called Party or CdPN)
d) the starting time of the call (date and time)
e) the call duration (start to end time of the call)
f) the billing phone number that is charged for the call (Charging Number or CN)
g) the disposition or the results of the call, indicating, for example, whether or not the call was connected (Disposition)
h) the route by which the call left the telecommunication switch (Trunk Group Number)
i) any fault condition encountered (Fault Code or Cause Code)

Data fields containing more relevant information may be added to (appended to) a CDR, thereby growing the number of data fields associated with the CDR, and thereby enriching the information contained in the CDR. FIG. 4 provides an illustration of CDRs which are each identified by a unique Sequence Number. The "Enrichment" data fields shown in FIG. 4 represent data fields that have been added to the CDR to enrich the information contained in the CDR.

The MSC (for example, Verizon Wireless®) maintains another table with details regarding the interconnections (trunk groups) between the MSC and other telecommunication networks. This table, known as a Trunk Group Table, is shown designated as 52 in FIG. 5. The Trunk Group Table 52 includes the Operator Carrier Number (OCN) of the office (MSC, End Office, or Tandem) to which each Trunk Group interconnects (OCN of the Trunk Group). The Trunk Group OCN in the Table may be compared with the OCN of the Terminating Provider to determine if the call was routed through an Intermediate Provider. The OCN of the Terminating Provider may be derived from the CdPN which is captured in the CDR generated by the Originating Provider (for example, the Verizon Wireless® MSC).

The LERG table, designated as 54 in FIG. 5, includes the OCN of the CdPN. The Originating Provider (for example, the Verizon Wireless® MSC) database 70 (for example, the Verizon Wireless® Mobile AMA Record System (MARS) database) may enrich the CDRs collected by data mediation system 50 with the OCN of the Trunk Group and the OCN of the CdPN (OCN of the Terminating Provider).

Figure 6:
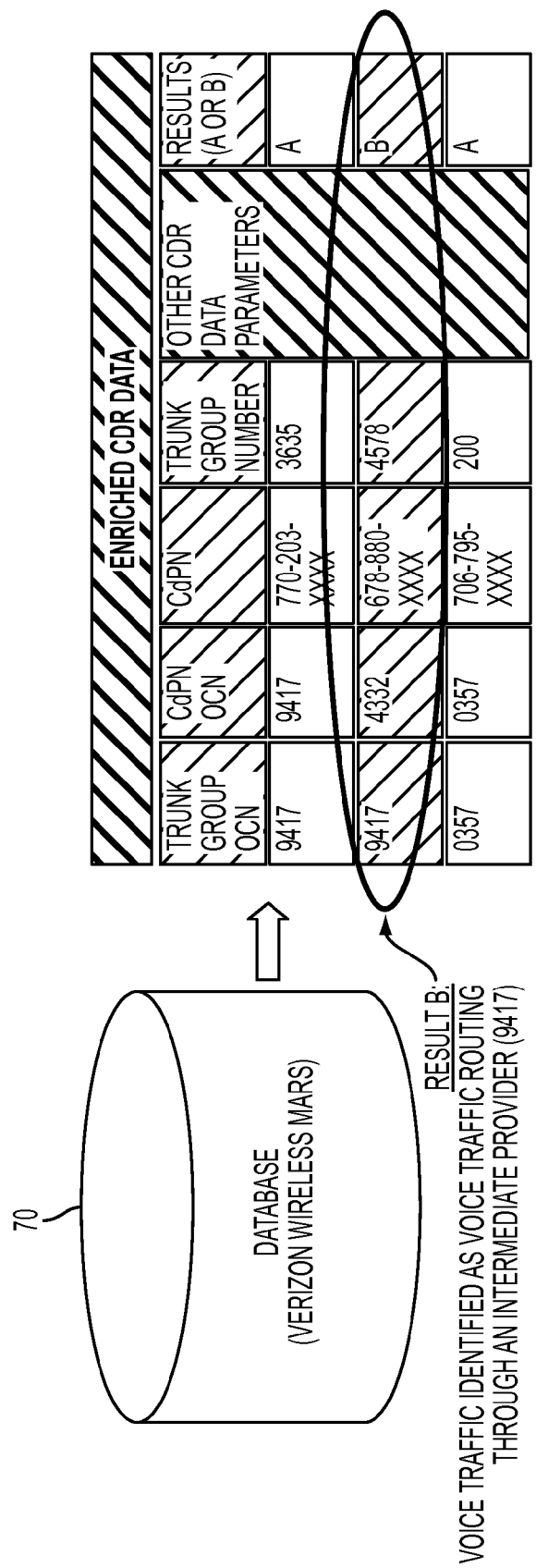
FIG. 6 illustrates an example of a CDR enriched with other data that are stored in a database of the MSC, in accordance with an embodiment of the present invention.

Thus, database 70 of the present application receives CDRs that include the CdPN and the Trunk Group Number; the database 70 enriches the collected CDRs by appending the OCN of the CdPN and the OCN of the Trunk Group to each CDR, creating an expanded CDR containing both original data fields and added (enrichment) data fields. An example of some common CDR data and enrichment CDR data is shown in FIGS. 4 and 6. As an example, the first column depicts the OCN of the Trunk Group; the second column shows the OCN of the CdPN; the third column depicts the CdPN; and the fourth column shows the Trunk Group Number. The first two columns include data that are considered enriched data appended (added) to the CDR; the third and fourth columns include data that are normally (commonly) found in the CDR.

In operation, if the OCN of the Trunk Group matches the OCN of the CdPN, then the call did not route through an Intermediate Provider, which is result A in FIG. 6. On the other hand, if the OCN of the Trunk Group does not match the OCN of the CdPN, then the call did route through an Intermediate Provider, which is result B in FIG. 6.

The last column of the Table identifies result A or result B. Result A implies no Intermediate Provider is present, whereas result B implies an Intermediate Provider is involved as an intermediary (transiting traffic) between the Originating Provider (for example, the Verizon Wireless® MSC) and the Terminating Provider. Since the first row and the third row of the Table show the OCN of the Trunk Group and the OCN of the CdPN having the same numerical value (e.g. 9417, or 0357), a conclusion may be reached and tabulated that no Intermediate Provider is present during the call. Since the OCN of the Trunk Group does not match the OCN of the CdPN (9417≠4332) in the second row, however, the result obtained is "B", which denotes that the voice traffic (or call) is routed through an Intermediate Provider.

Figure 7:
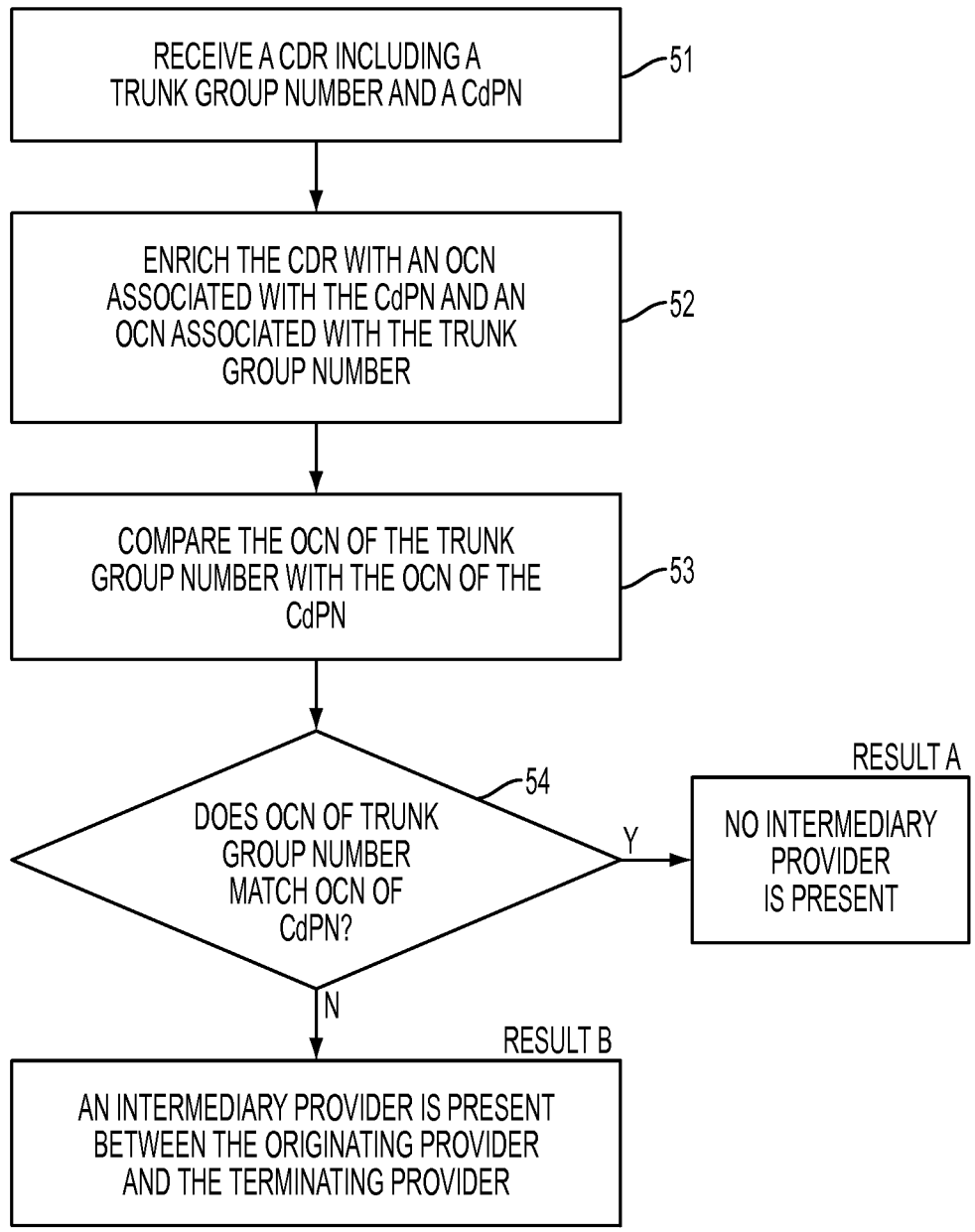
FIG. 7 is a flow diagram showing a method of the present invention for identifying a transit provider disposed between an originating provider and a terminating provider, in accordance with an embodiment of the present invention.

Having described a system, a method is described next by reference to FIG. 7. As shown, step 1 (S1) receives a CDR for each call processed by an MSC (operated, for example, by Verizon Wireless®). Each CDR includes a Trunk Group Number, which identifies a trunk group used by the MSC to complete the call. Each CDR also includes a CdPN, which identifies the number of the party being called. Step 2 (S2) enriches each CDR with an OCN associated with the Trunk Group Number (received from Trunk Group Table 52 in FIG. 5) and an OCN associated with the CdPN (received from LERG 54 in FIG. 5). Step 3 (S3) compares the Trunk Group OCN (the OCN associated with the Trunk Group Number) with the CdPN OCN (the OCN associated with the CdPN).

Step 4 (S4) provides result A as a conclusion, if the Trunk Group OCN matches the CdPN OCN, which denotes that the call did not route through an Intermediate Provider. Step 4 (S4) provides result B as a conclusion, however, if the Trunk Group OCN does match the CdPN OCN, which denotes that the call did route through an Intermediate Provider. Result B identifies the traffic routing through an Intermediate Provider, where an Intermediate Provider may be an LEC Tandem, Alternate Tandem Provider (ALT), or other third-party provider.

These general and specific aspects may be implemented using a system, a method, a computer program, a computer readable medium, or an apparatus or any combination of systems, methods, computer programs, computer readable mediums, and/or apparatuses.

As shown by the above discussion, functions relating to enriching CDRs with external data may be implemented on computers connected for data communication via the components of a packet data network, operating with data mediation system 50 and database 70, as shown in FIG. 1. Although special purpose devices may be used, such devices also may be implemented using one or more hardware platforms intended to represent a general class of data processing device commonly used to run "server" programming so as to implement the enrichment and reporting functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for enriching the call records. The software code is executable by the general-purpose computer that functions as the data mediation system 50 on a server device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enriching the call records with external data, in essentially the manner performed in the implementations discussed and illustrated herein.

Figure 8:
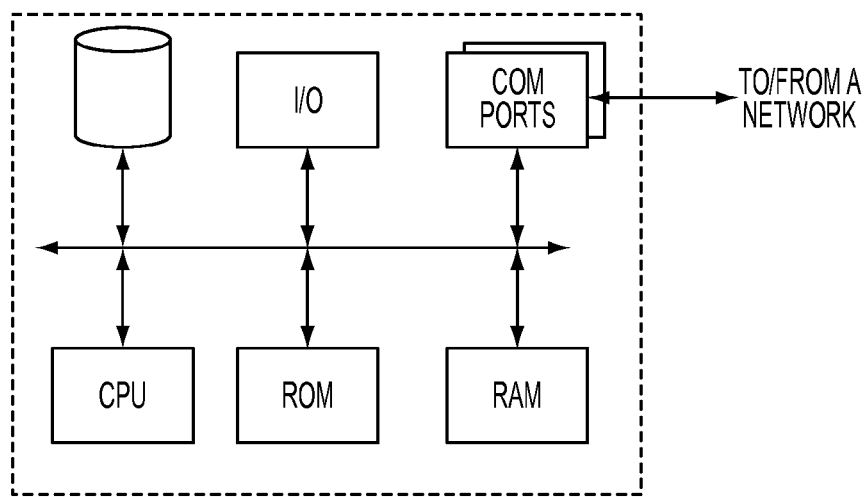
FIG. 8 illustrates a network or host computer platform, as may typically be used to implement a server.
Figure 9:
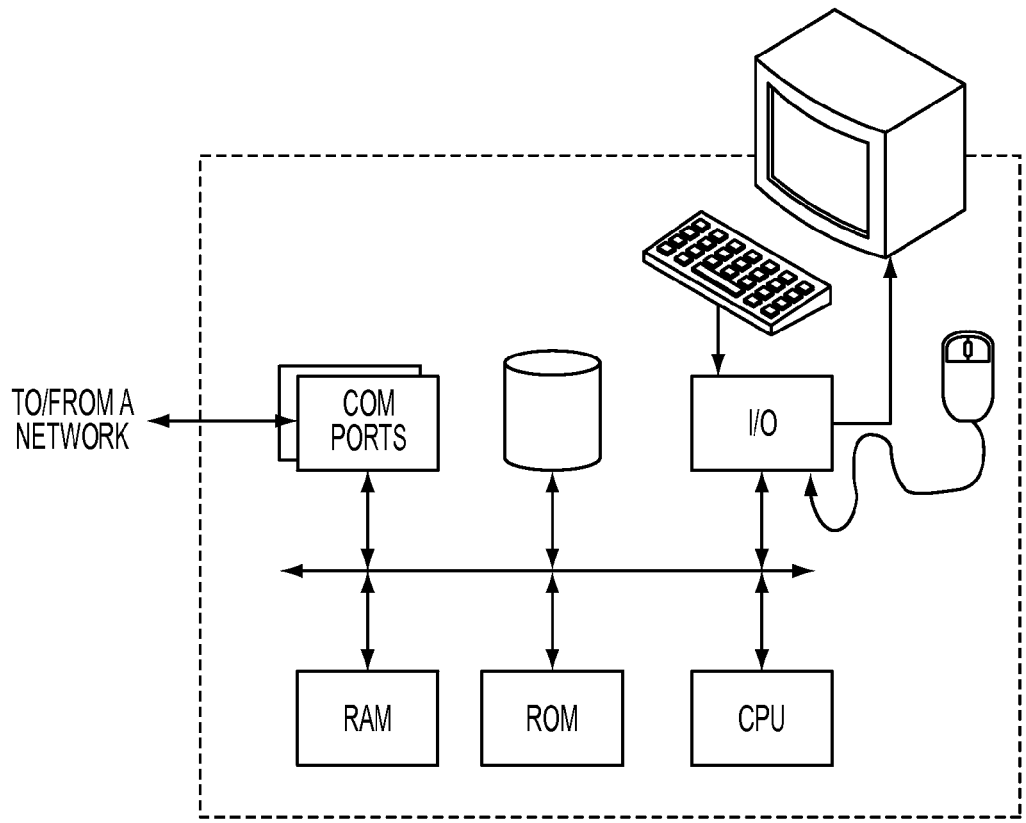
FIG. 9 depicts a computer with user interface elements, as may be used to implement a personal computer, or another type of workstation, or terminal device.

FIGS. 8 and 9 provide functional block diagram illustrations of general purpose computer hardware platforms. FIG. 8 illustrates a network or host computer platform, as may typically be used to implement a server. FIG. 9 depicts a computer with user interface elements, as may be used to implement a personal computer, or other type of work station, or terminal device, although the computer of FIG. 9 may also act as a server, if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms to distribute the processing load.

A computer type user terminal device, such as a PC or tablet computer, similarly includes a data communication interface CPU, main memory and one or more mass storage devices for storing user data and the various executable programs (see FIG. 9). A mobile device type user terminal may include similar elements, but typically may use smaller components that also require less power, to facilitate implementation in a portable form factor. The various types of user terminal devices may also include various user input and output elements. A computer, for example, may include a keyboard and a cursor control/selection device, such as a mouse, trackball, joystick or touchpad; and a display for visual outputs, a microphone and speaker enabled audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and is presumed that those skilled in the art are adequately familiar therewith.

Hence, aspects of the methods of enriching call records with other data outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communication, for example, may enable loading of the software from one computer or processor into another, for example, from a management server or host computer of the telephone service provider into the computer platform running the data preparation process. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to a tangible storage medium, a carrier wave medium, or physical transmission medium. Non-volatile storage media include, for example, optical or magnetic disks, such as any of the storage devices in any computer(s) or the like, such as may be used to implement database 70 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves, such as those generated during radio frequency (RF) and infrared (IR) data communications. Common forms of computer-readable media, therefore, include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "a" or "an" does not, without further constraints, preclude the existence of additional identical elements in the process, method, article, or apparatus that comprises the element.

What is claimed is:

1. A method comprising:
   receiving, at a processor, Call Detail Records (CDRs) from a data mediation system, in which each CDR includes a called party number (CdPN) and a trunk group number,
      the trunk group number associated with a trunk group that interconnects a first communication network as an Originating Provider with a second communication network, and
      where the trunk group number does not include and is not any portion of the CdPN;
   obtaining, from a first digital table, a first Operating Carrier Number (OCN) associated with the CdPN and assigned to the second communication network;
   obtaining, from a second digital table, a second OCN assigned to a third communication network that connects to the trunk group; and
   concluding that the Originating Provider communicated directly with the second communication network, if the first OCN equals the second OCN.

2. The method of claim 1 wherein
   the first and second OCNs, if equal, identify a Terminating Provider communicating directly with the Originating Provider.

3. The method of claim 1 further comprising:
   concluding that the Originating Provider communicated indirectly with the second communication network, if the first OCN does not equal the second OCN.

4. The method of claim 3 wherein
   communicating indirectly includes transiting a message between the Originating Provider and a Terminating Provider by way of an Intermediate Provider.

5. The method of claim 4 wherein
   the Intermediate Provider includes an LEC tandem provider, an alternate tandem provider, or another third party provider.

6. The method of claim 1 wherein
   the first digital table includes unique OCNs corresponding to multiple communication networks operating in the United States, and
   the first digital table is obtained from a Local Exchange Routing Guide (LERG).

7. The method of claim 1 wherein
   the second digital table is maintained by the Originating Provider for providing OCNs corresponding to other providers that connect to trunk groups belonging to the Originating Provider.

8. The method of claim 1 wherein
   the Originating Provider is an LEC operating an End Office, a CMRS Provider operating a Mobile Switching Center (MSC), or another telecommunications carrier which originates telecommunications traffic from its network.

9. The method of claim 1 further comprising:
   enriching, by the processor, the CDRs with data obtained from the first and second digital tables.

10. The method of claim 9 further comprising:
    storing the enriched CDRs in a database.

11. A method of enriching a Call Detail Record (CDR) to identify traffic routing through network providers, the method comprising:
- obtaining Operator Carrier Numbers (OCNs) assigned to network providers;
- obtaining trunk group identifiers for identifying trunk groups which interconnect a first network of an Originating Provider, including a mobile switching network, with other networks of other network providers,
- where the trunk group identifiers do not include or are not any portion of a Called Part Number (CdPN) associated with the CDR;
- identifying network providers which communicate through the trunk groups with the first network including a mobile switching network's Mobile Switching Center (MSC);
- associating the network providers, which communicate through the trunk groups, with the OCNs; and
- storing, in a database that includes the CDR, the OCNs of the network providers which communicate through the trunk groups, as OCNs of the trunk groups.

12. The method of claim 11 further comprising:
- obtaining a CdPN from a CDR of the CDRs;
- associating the CdPN with an OCN of a network provider; and
- storing, in the database, the OCN of the network provider, as an OCN of the CdPN.

13. The method of claim 12 further comprising:
- determining that the OCN of a trunk group, stored in the database and the OCN of the CdPN, stored in the database are the same; and
- concluding that the first network of the Originating Provider including a mobile switching network's MSC is communicating directly with the network of the network provider, without any other network provider operating as an Intermediate Provider.

14. The method of claim 12 further comprising:
- determining that the OCN of a trunk group, stored in the database and the OCN of the CdPN, stored in the database, are different; and
- concluding that the first network of the Originating Provider including a mobile switching network's MSC is communicating indirectly with the network of the network provider with another network provider operating as an Intermediate Provider.

15. The method of claim 14 wherein
- the Intermediate Provider includes an LEC tandem provider, an alternate tandem provider, or another third party provider.

16. The method of claim 15 wherein
- the network provider associated with the OCN of the CdPN is a Terminating Provider.

17. A server comprising:
- a processor, and
- a memory storing executable instructions for causing the processor to:
  - obtain Operator Carrier Numbers (OCNs) assigned to network providers;
  - obtain trunk group identifiers for identifying trunk groups that interconnect a network of an Originating Provider including a mobile switching network with other networks of network providers;
  - obtain a Called Party Number (CdPN) from a CDR, where the trunk group identifiers do not include or are not any portion of the CdPN;
  - associate the other network providers, which communicate through the trunk groups with the OCNs;
  - associate the CdPN with an OCN of a network provider; and
  - store, in a database that includes the CDR, the OCNs of the CdPN's network provider, as OCNs of the CdPN, and
  - store, in the database, the OCNs of the network providers, which communicate through the trunk groups, as OCNs of the trunk groups.

18. The server of claim 17 wherein the executable instructions further cause the processor to:
- determine that the OCN of a trunk group, stored in the database, and the OCN of the CdPN, stored in the database, are the same; and
- conclude that the network of the Originating Provider including a mobile switching network's Mobile Switching Center (MSC) is communicating directly with the network of the network provider, without any other network provider operating as an Intermediate Provider.

19. The server of claim 17 wherein the executable instructions further cause the processor to:
- determine that the OCN of a trunk group, stored in the database, and the OCN of the CdPN, stored in the database, are different; and
- conclude that the network of the Originating Provider including a mobile switching network's MSC is communicating indirectly with the network of the network provider with another network provider operating as an Intermediate Provider.

20. The server of claim 19 wherein
- the intermediate provider includes an LEC tandem provider, an alternate tandem provider, or another third party provider.

* * * * *